(12) United States Patent
Chakravarti

(10) Patent No.: US 11,826,804 B2
(45) Date of Patent: Nov. 28, 2023

(54) SYSTEMS AND METHODS FOR PRODUCTION OF METALLURGICALLY BONDED CLAD BILLET AND PRODUCTS THEREOF, AND METALLURGICALLY BONDED CLAD BILLET

(71) Applicant: Bhaven Chakravarti, Bellaire, TX (US)

(72) Inventor: Bhaven Chakravarti, Bellaire, TX (US)

(*) Notice: Subject to any disclaimer, the term of this patent is extended or adjusted under 35 U.S.C. 154(b) by 775 days.

(21) Appl. No.: 16/793,782

(22) Filed: Feb. 18, 2020

(65) Prior Publication Data

US 2020/0276627 A1    Sep. 3, 2020

Related U.S. Application Data

(60) Provisional application No. 62/812,488, filed on Mar. 1, 2019.

(51) Int. Cl.
    *B21C 33/00*    (2006.01)
    *B21C 23/22*    (2006.01)
    (Continued)

(52) U.S. Cl.
    CPC ............ *B21C 33/004* (2013.01); *B21C 23/22* (2013.01); *B21C 37/154* (2013.01);
    (Continued)

(58) Field of Classification Search
    CPC ....... B21C 23/22; B21C 43/00; B21C 37/154; B23P 11/025; B22F 2998/10; B23K 2101/06
    (Continued)

(56) References Cited

U.S. PATENT DOCUMENTS 3,481,024 A   12/1969  Bunn
4,573,629 A    3/1986  Imahashi et al.
(Continued)

FOREIGN PATENT DOCUMENTS

GB         1258141        * 1/1969
KR      20150130960       * 11/2015

OTHER PUBLICATIONS

Office Action issued by the United States Patent and Trademark Office dated Mar. 30, 2023 in U.S. Appl. No. 17/325,586 (38 pages).

*Primary Examiner* — Jimmy T Nguyen
*Assistant Examiner* — Smith Oberto Bapthelus
(74) *Attorney, Agent, or Firm* — McCutcheon Joseph, PLLC

(57) ABSTRACT

A method of producing a clad billet includes heating a corrosion resistant alloy (CRA) cylinder having a hollow interior to expand its inner diameter; inserting a solid carbon or low-alloy steel (CS) material into the hollow interior of the heated (CRA) cylinder so that an outer surface of the (CS) material faces the inner diameter of the (CRA) cylinder; cooling the (CRA) cylinder to contract and shrink the inner diameter of the (CRA) cylinder onto the outer surface of the (CS) material creating an interference fit at an interface with the outer surface, resulting in a composite billet assembly; and hot extruding the composite billet assembly to reduce its size and form the clad billet having a metallurgical bond between the (CS) material and the (CRA) cylinder. The clad billet can be hot-rolled to form metallurgically-bonded clad bar, or can be cold pilgered/cold drawn to form a metallurgically-bonded clad pipe.

18 Claims, 6 Drawing Sheets

(51) Int. Cl.
*B21C 37/15* (2006.01)
*B23P 11/02* (2006.01)
*B23K 101/06* (2006.01)

(52) U.S. Cl.
CPC ......... *B23P 11/025* (2013.01); *B22F 2998/10* (2013.01); *B23K 2101/06* (2018.08)

(58) Field of Classification Search
USPC ........................................................ 72/256
See application file for complete search history.

(56) References Cited

U.S. PATENT DOCUMENTS

| | | |
|---|---|---|
| 4,600,332 A | 7/1986 | Sharp et al. |
| 4,881,679 A | 11/1989 | Turner |
| 5,056,209 A | 10/1991 | Ohashi et al. |
| 5,261,591 A | 11/1993 | Hardwick |
| 5,332,454 A | 7/1994 | Meredith et al. |
| 5,865,238 A * | 2/1999 | Carden ................... B22D 17/30 164/113 |
| 5,988,484 A * | 11/1999 | Osborn ................... B21C 23/22 228/175 |
| 6,316,126 B1 | 11/2001 | Hasegawa et al. |
| 6,691,397 B2 * | 2/2004 | Chakravarti .......... B21C 37/154 29/527.1 |
| 8,281,976 B2 | 10/2012 | Caizza et al. |
| 10,112,254 B2 | 10/2018 | Chakravarti et al. |
| 2005/0251987 A1 | 11/2005 | Urech et al. |
| 2011/0017339 A1* | 1/2011 | Chakravarti .......... B21C 37/154 138/143 |
| 2016/0052080 A1* | 2/2016 | Chakravarti .......... B23K 20/227 148/521 |
| 2017/0151611 A1 | 6/2017 | Secondi et al. |
| 2020/0130035 A1* | 4/2020 | Rauffmann ................ B21C 1/22 |

* cited by examiner

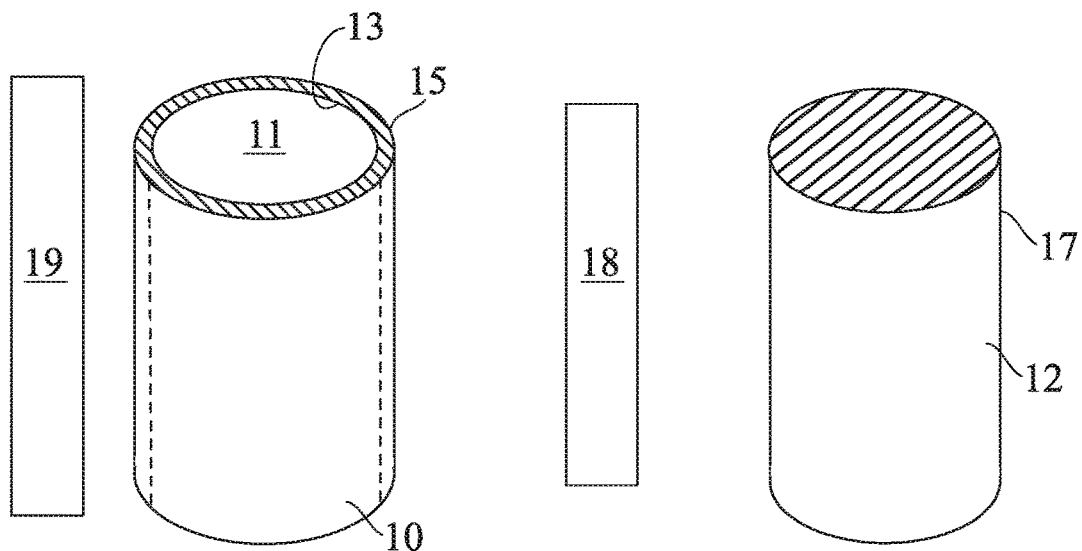
Fig. 1A          Fig. 1B
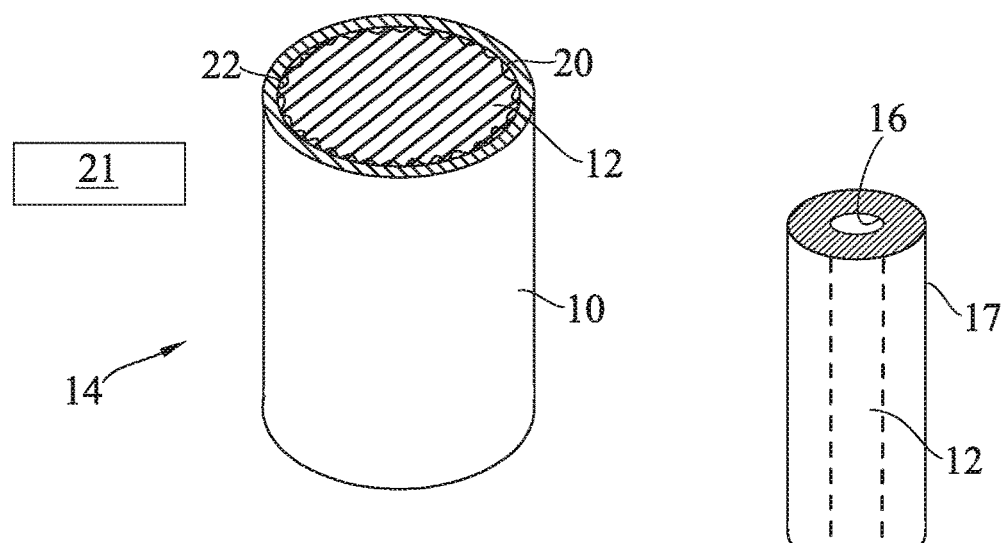
Fig. 1D
Fig. 1C

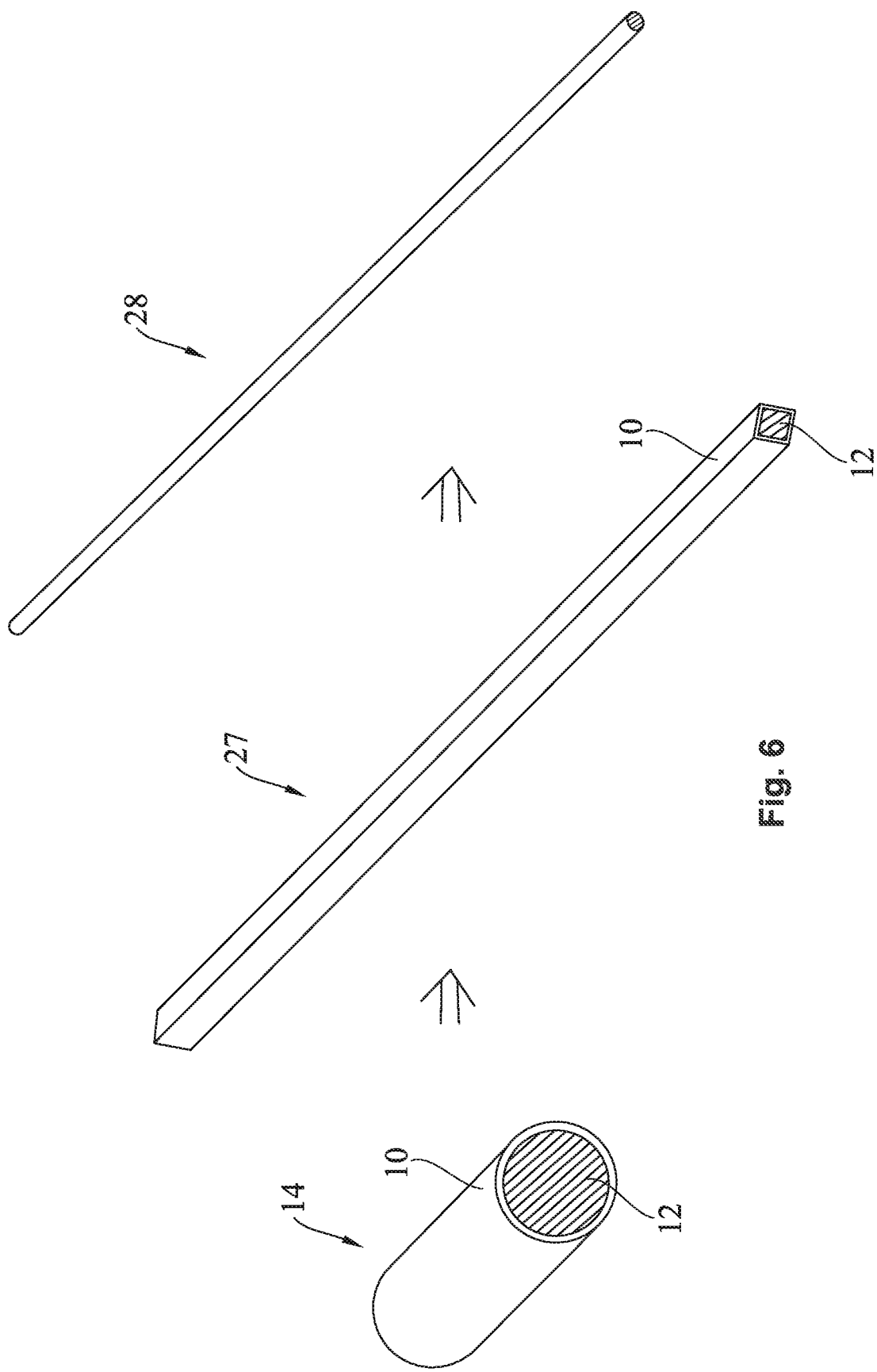

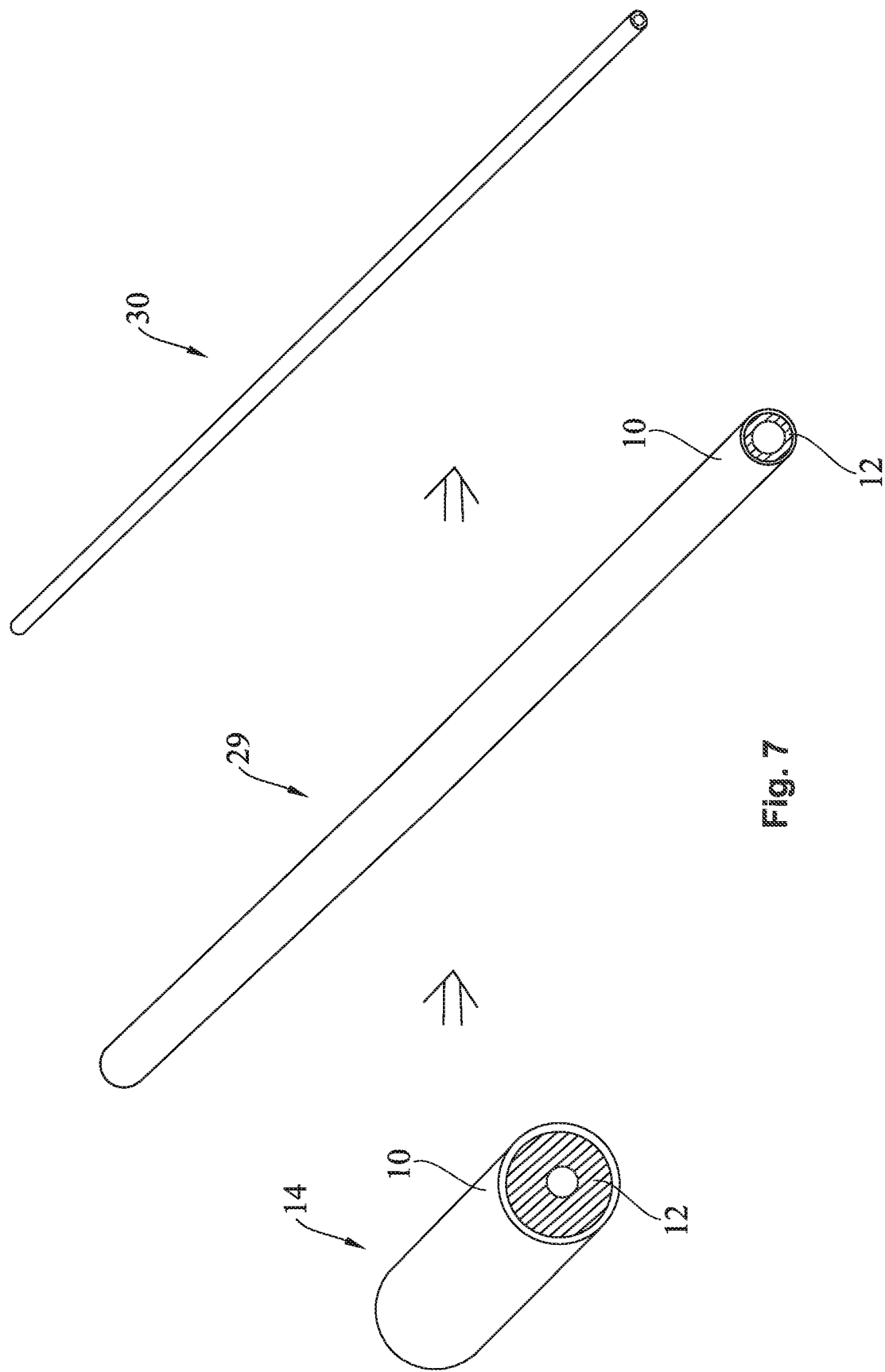

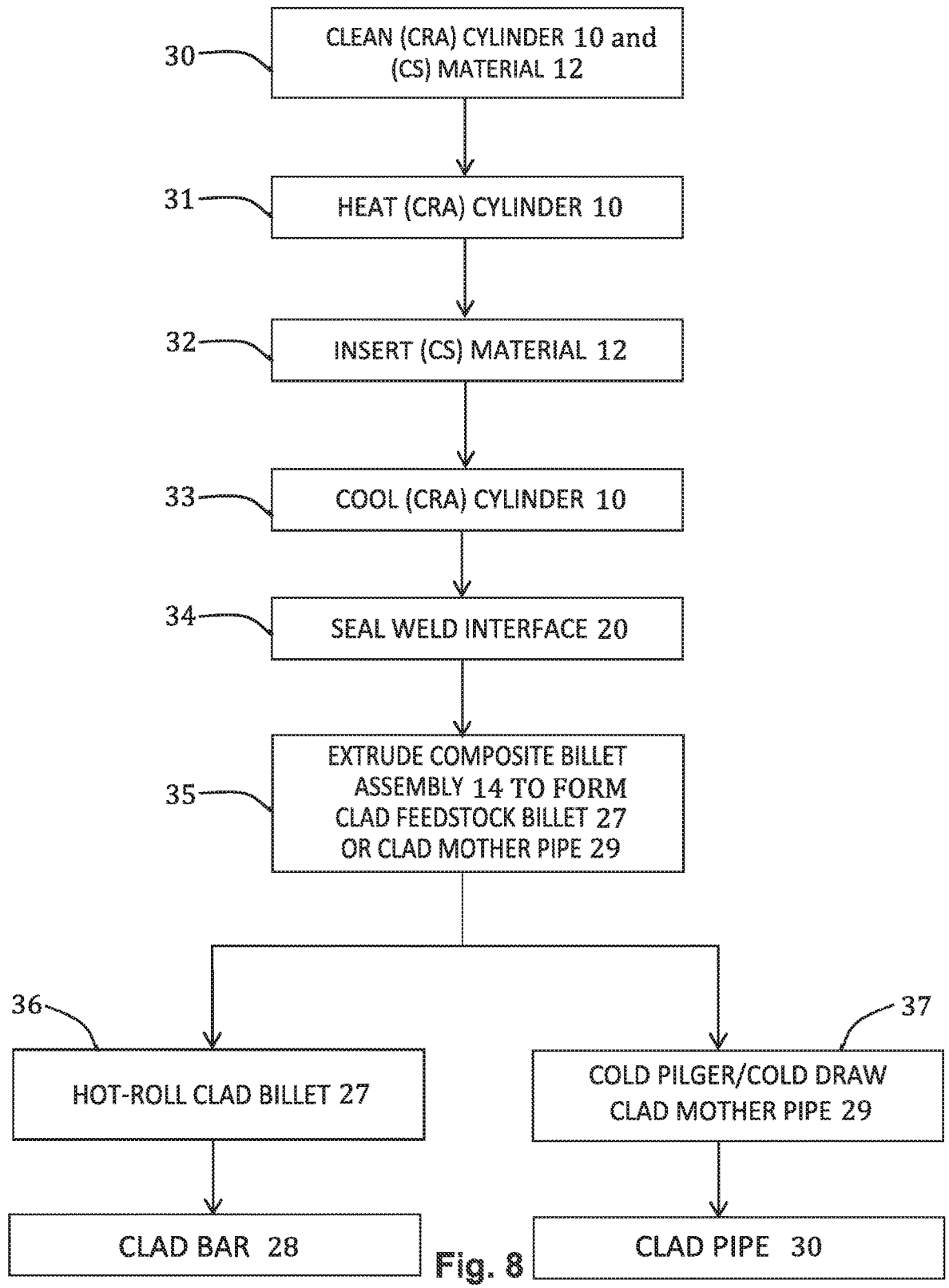

SYSTEMS AND METHODS FOR PRODUCTION OF METALLURGICALLY BONDED CLAD BILLET AND PRODUCTS THEREOF, AND METALLURGICALLY BONDED CLAD BILLET

CONTINUITY DATA

This application claims the benefit of U.S. Provisional Application No. 62/812,488, filed on Mar. 1, 2019. The disclosure of the prior application is hereby incorporated by reference herein in its entirety.

TECHNICAL FIELD

The present disclosure relates to methods and systems for producing a clad billet composed of solid carbon or low-alloy steel (CS) and a corrosion resistant alloy (CRA), and products thereof.

BACKGROUND

Commodity hot rolled carbon or low-alloy steel (CS) bars have widespread applications. One major application of (CS) bars is for reinforcing concrete, a popular and versatile construction material due to its high compressive strength among other properties. Due to concrete's relatively low tensile strength and inability to deform without breaking, (CS) bars (commonly referred to as "rebar") have been placed inside concrete slabs before curing. The internal (CS) bars help the cured concrete resist tensile stresses and avoid structural failure of the concrete.

Such reinforced concrete is used for buildings, marine structures, roads, bridges, and other transportation projects. In some geographic locations, chloride salts are often applied to concrete road surfaces during cold temperatures to limit icing on the roads for safety purposes. The chloride/salt solution permeates through the porous concrete and reacts with the (CS) bar, creating rust as a corrosion product. Rust weakens the (CS) bar by reducing the amount of load bearing material that provides strength. Also, rust has approximately 30% more volume than the carbon steel it replaces, and so the increased volume of the (CS) bar causes internal stress and cracking of the concrete, making the whole concrete pavement and structure prone to deterioration over time. As a result, the concrete may fail to provide a required service life. Similarly, reinforcing (CS) bar can deteriorate over time due to corrosion by being exposed to marine atmospheres, oxidizing gases, or other corroding elements, resulting in catastrophic failure. Maintenance and repair of such concrete roads currently in service have been estimated by the National Association of Corrosion Engineers (NACE) to cost around $8 billion per year. In other applications, chlorides and other corroding elements are known to attack (CS) rods by corrosion, such as (CS) sucker rods exposed to sour oil wells containing $H_2S$ and chlorides that cause corrosion and reduce the required service life.

Attempts have been made to develop a cost effective corrosion resistant (CS) bar to provide the required service life for the applications discussed above, as well as others. Corrosion resistant coatings have represented the simplest solutions, and coating systems which spray a coating material onto the (CS) bar have been developed and implemented. Such coatings, however, represent only a partial solution to the corrosion problem, due to inherent porosity in the coating and other property issues. Upgrading with solid corrosion resistant alloy (e.g., a solid stainless steel rebar) may help solve the corrosion problem, but that solution is very expensive, and drives up the cost beyond potential economic feasibility.

Attempts to produce a metallurgically bonded clad bar have been made, as an optimum material for a long term corrosion solution. For example, stainless clad rebar (SCR), in which the carbon steel core provides the mechanical properties and stainless steel surface resists the chloride corrosion, provides an optimum solution for concrete applications at a fraction of the cost of solid stainless bars. Similarly, other (CRA) claddings can provide design service life for other applications at a fraction of the solid (CRA) bar cost. Development of stainless clad rebar (SCR) with metallurgical bonding has been attempted over the years. One such process for manufacturing stainless clad steel products involves tightly wrapping a stainless steel sheathing over a carbon steel bar, with placement of various substances added at the ends and sealed to help maintain clean opposing surfaces of the bar and sheathing that form the billet. To create such a bond requires: (i) clean, un-oxidized surfaces of both the carbon steel bar and the stainless steel sheathing; (ii) lack of oxygen between the contact surfaces for bonding to minimize or eliminate oxidation; and (iii) high pressure at high temperature applied to the bonding surfaces. The sheathing is formed around the carbon steel bar as tightly as possible to minimize the gap between the two materials. However, the tighter the gap the more difficult it is for the protective mechanism to work deep into the relatively long, e.g., 40 foot length of the sheathing. As the sealed billet is heated to rolling temperature, any surface areas left unprotected inside the billet oxidize and fail to bond, even though substantial reduction occurs on the billet at high temperature and pressure going through the stages of the rod rolling mill. This process has shown variability in metallurgical bonding from point to point within each billet, and from billet to billet, resulting in poor bonding reliability, non-uniform cladding thickness, and other issues in production, such that the resulting product fails to meet minimum metallurgical bond requirements.

Another technique for producing stainless steel clad rebar was developed utilizing the "Osprey Process," in which a molten, atomized stream of stainless steel is deposited onto a rotating, heated carbon steel bar in an evacuated chamber to build up the required stainless steel thickness. Once the required thickness is achieved, the bar is rolled through the mill to produce stainless steel clad rebar. A problem with this process is that the deposit inherently has porosity even when applied with high velocity guns. Moreover, the molten particles do not create a metallurgical (e.g., atom-to atom) bond with the carbon steel bar. The molten particle on impact is immediately quenched on hitting the carbon steel bar, creating a surface that fails to bond. Once the metallurgical bond is not formed on deposition, further processing through the mill will likewise not create the metallurgical bond. The "Osprey Process" has not been further developed for this application.

SUMMARY

There is a critical need for a process that produces high quality, 100% metallurgically bonded (CRA) clad bars that are resistant to corrosion and do not suffer from the problems encountered with the conventional manufacturing techniques discussed above. A further need exists for corrosion resistant bars, pipes, sucker rods, shafts, etc., that provide a required service life in environments that are subject to corrosive materials.

In embodiments of the present disclosure achieve these needs.

Generally, stainless clad (CS) bars provide an optimum material at a fraction of the cost of solid stainless bars for resisting corrosion in concrete. The stainless clad (CS) bars have a carbon or low-alloy steel core for mechanical properties, and stainless steel cladding surface to resist corrosion problems in applications such as, for example, pavements and highways, marine structures, and other areas that are prone to corrosive materials such as chloride. The same is true for stainless clad (CS) pipes, i.e., having a cylindrical hollow (CS) material for a core. The ability to produce corrosion resistant alloy (CRA) clad bars and pipes through the integrated operations of today's rod rolling mills and cold pilger/cold draw mills, respectively, provides opportunities in maintaining productivity and controlling production cost to obtain final products of (CRA) clad bars and pipes.

Embodiments of the methods, processes and billets discussed herein provide a significant improvement over the previous attempts to produce clad billet products, such as stainless clad rebar (SCR) and stainless clad pipes, because the disclosed methods and processes assure the formation of a 100% metallurgical bond (atom-to-atom), with a uniformly distributed clad thickness, on a consistently repeatable basis, thereby avoiding the conventional problems of metallurgical bonding failures and non-uniform cladding.

The present disclosure relates to methods and systems for producing a composite billet assembly, composed of a carbon or low-alloy steel (CS) core and a corrosion resistant alloy (CRA) pipe/tube/cylinder on the outer diameter of the (CS) core, for co-extrusion. Upon co-extrusion, the composite billet assembly forms a metallurgically bonded (atom-to-atom) clad billet that can be directly fed to a rod rolling mill for production of various clad bar products, or that can be directly fed to a cold pilger/cold draw mill for production of various clad pipe products. That is, the clad billet comprises a carbon or low-alloy steel core with a metallurgically bonded corrosion resistant alloy cladding on the outer diameter of the steel core. This 100% metallurgically bonded clad billet works either as a final product or as an intermediate product, which may be fed to a rod rolling mill or a cold pilger/cold draw mill for further reductions to produce a variety of other finished clad products such as, Stainless Clad Rebar (SCR), Clad Sucker Rods, Clad Shafts, Clad Pipes, and other applications.

According to one embodiment, a method of producing a clad billet, comprises: heating a corrosion resistant alloy cylinder, the corrosion resistant alloy cylinder including a hollow interior, an inner diameter, and an outer diameter, wherein the heating expands at least the inner diameter; inserting a solid carbon or low-alloy steel material into the hollow interior of the heated corrosion resistant alloy cylinder so that an outer surface of the solid carbon or low-alloy steel material faces the inner diameter of the corrosion resistant alloy cylinder; cooling the heated corrosion resistant alloy cylinder to contract at least the inner diameter of the corrosion resistant alloy cylinder so that the inner diameter shrinks onto the outer surface of the solid carbon or low-alloy steel material creating an interference fit at an interface with the outer surface and resulting in a composite billet assembly; and extruding the composite billet assembly to reduce the size of the composite billet assembly by reducing a thickness of each of the corrosion resistant alloy cylinder and the solid carbon or low-alloy steel material and form the clad billet having a metallurgical bond between the solid carbon or low-alloy steel material and the corrosion resistant alloy cylinder.

According to an embodiment, the method further comprises cleaning the outer surface of the solid carbon or low-alloy steel material and the surface of the inner diameter of the corrosion resistant alloy cylinder, before inserting the solid carbon or low-alloy steel material into the hollow interior of the heated corrosion resistant alloy cylinder.

According to an embodiment, the cleaning removes at least one of oxides, oils and rust.

According to an embodiment, the method further comprises welding each opposite end of the composite billet assembly at the interface, before extruding the composite billet assembly, to create a seal against oxidation of the interface.

According to an embodiment, the composite billet assembly comprises an outer diameter of 3 inches to 45 inches, and the clad billet comprises a cross-sectional dimension of 1 inch to 20 inches after the extruding.

According to an embodiment, the method further comprises hot-rolling the clad billet to form a clad rod.

According to an embodiment, the method further comprises at least one of cold pilgering and cold drawing the clad billet to form a clad pipe.

According to an embodiment, the solid carbon or low-alloy steel material is a bar.

According to an embodiment, the solid carbon or low-alloy steel material is a hollow cylinder.

According to an embodiment, the extruding shapes the clad billet to have a cross-sectional shape is one of a circle, cylinder, a rectangle, and a square.

According to an embodiment, the metallurgical bond is an atom-to-atom bond between the solid carbon or low-alloy steel material and the corrosion resistant alloy cylinder.

According to another embodiment, a system for producing a clad billet, comprises: a corrosion resistant alloy cylinder including a hollow interior, an inner diameter, and an outer diameter; a solid carbon or low-alloy steel material including an outer surface; a heater for heating the corrosion resistant alloy cylinder to expand at least the inner diameter of the corrosion resistant alloy cylinder; an insertion device for inserting the solid carbon or low-alloy steel material into the hollow interior of the heated corrosion resistant alloy cylinder so that the outer surface of the solid carbon or low-alloy steel material faces the inner diameter of the corrosion resistant alloy cylinder; an area to allow cooling of the heated corrosion resistant alloy cylinder to contract at least the inner diameter of the corrosion resistant alloy cylinder so that the inner diameter shrinks onto the outer surface of the solid carbon or low-alloy steel material and creates an interference fit at an interface with the outer surface, resulting in a composite billet assembly; and an extruder for extruding the composite billet assembly to reduce the size of the composite billet assembly by reducing a thickness of each of the corrosion resistant alloy cylinder and the solid carbon or low-alloy steel material and form the clad billet having a metallurgical bond between the solid carbon or low-alloy steel material and the corrosion resistant alloy cylinder.

According to an embodiment, the system further comprises a cleaning device for cleaning at least one of oxides, oils and rust from the outer surface of the solid carbon or low-alloy steel material and the surface of the inner diameter of the corrosion resistant alloy cylinder.

According to an embodiment, the system further comprises a welding device for welding each opposite end of the composite billet assembly at the interface to create a seal against oxidation of the interface.

According to an embodiment, the system further comprises at least one of: a hot-rolling device for hot-rolling the clad billet to form a clad rod; and a cold pilgering/cold drawing device for at least one of cold pilgering and cold drawing the clad billet to form a clad pipe.

According to a further embodiment, a clad billet comprises: a carbon or low-alloy steel core; and a corrosion resistant alloy outer layer covering the carbon or low-alloy steel core, wherein the corrosion resistant alloy outer layer has a metallurgical bond with the carbon or low-alloy steel core defined by an atom-to-atom bond between the corrosion resistant alloy outer layer and the carbon or low-alloy steel core.

According to an embodiment, the clad billet further comprises a length of 20 feet to 60 feet; and a cross-sectional dimension of 3 inches to 10 inches.

According to an embodiment, a cross-sectional shape of the composite billet assembly is one of a circle, a cylinder, a rectangle, and a square.

The foregoing is intended to give a general idea of the embodiments, and is not intended to fully define nor limit the invention. The embodiments will be more fully understood and better appreciated by reference to the following description and drawings.

BRIEF DESCRIPTION OF THE DRAWINGS

In the detailed description of various embodiments usable within the scope of the present disclosure, presented below, reference is made to the accompanying drawings, in which:

FIG. 1A illustrates an embodiment of a corrosion resistant alloy cylinder.

FIG. 1B illustrates an embodiment of a solid carbon or low-alloy steel material.

FIG. 1C illustrates another embodiment of a solid carbon or low-alloy steel cylinder material.

FIG. 1D illustrates an embodiment of a composite billet assembly.

FIG. 6 illustrates the stages of a composite billet assembly, a clad feedstock billet, and a clad bar, according to an embodiment.

FIG. 7 illustrates the stages of a composite billet assembly, a clad mother pipe, and a clad pipe, according to an embodiment.

FIG. 8 illustrates the steps associated with a method of producing a clad billet and products thereof.

DETAILED DESCRIPTION OF THE EMBODIMENTS

Figure 2:
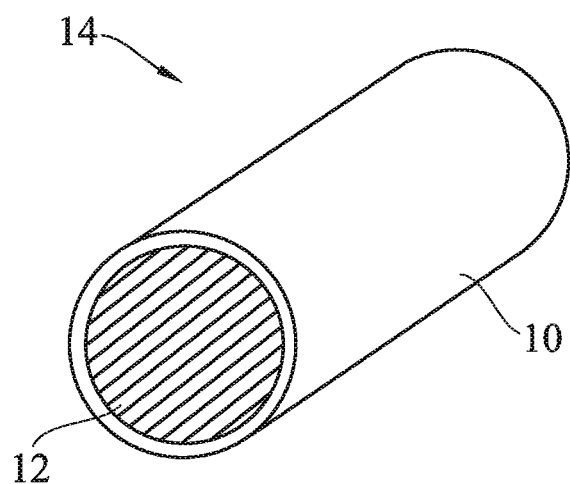
FIG. 2 illustrates a perspective view of the composite billet assembly according to an embodiment.

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

FIGS. 1A to 1D illustrate embodiments of a corrosion resistant alloy (CRA) cylinder 10, a solid carbon or low-alloy steel (CS) material 12, and a composite billet assembly 14 formed by inserting the (CS) material 12 into the (CRA) cylinder 10. The (CRA) cylinder 10, as shown in FIG. 1A, may be formed of alloys including, but not limited to, all grades of Stainless Steels, Nickel based alloys, Copper based alloys, Titanium and Ti Alloys and other corrosion resistant alloys. The (CRA) cylinder 10 may have a substantially cylindrical shape, meaning that the (CRA) cylinder 10 has a hollow interior 11 extending throughout a length of the (CRA) cylinder 10, an inner diameter 13, and an outer diameter 15. In this regard, the (CRA) cylinder 10 may be shaped as a pipe, tube, cylinder, sleeve, channel, or conduit. In a preferred embodiment, the cross-sectional shape of the (CRA) cylinder 10 is circular. However, other polygonal cross-sectional shapes, such as rectangular, pentagonal, hexagonal, octagonal, etc., are within the scope of the present embodiments. The length of the (CRA) cylinder 10 is not particularly limiting, and in a preferred embodiment the length may be about 3 feet to 5 feet. In other embodiments, the length may range from 2 feet to 6 feet. The outer diameter 15 of the (CRA) cylinder 10 is not particularly limiting, and in a preferred embodiment the outer diameter 15 may be about 4 inches to 24 inches. In other embodiments, the outer diameter 15 may range from 3 inches to 50 inches. The thickness of the (CRA) cylinder 10 is not particularly limiting, and in a preferred embodiment the thickness may be about 0.5 inches to 1.5 inches. In other embodiments, the thickness may range from 0.375 inches to 5.0 inches or more.

FIG. 1B illustrates an embodiment of the solid carbon or low-alloy steel (CS) material 12. The carbon or low-alloy steel (CS) material 12 is described herein as being a "solid", meaning that the structure or nature of the carbon or low-alloy steel (CS) material 12 is substantially rigid, as opposed to a liquid, molten or powder form. The material forming the carbon or low-alloy steel includes, but not limited to, carbon and low alloy structural grade steels, chrome moly steels, typically as covered by ASTM, ASME, AISI, API, ISI specifications and other such equivalent specifications defining design, manufacturing, and building standards. In the embodiment of FIG. 1B, the (CS) material 12 is shaped as a bar, or block of material. In an alternative embodiment shown in FIG. 1C however, the (CS) material 12 is shaped as a hollow cylinder including a hollow interior extending throughout a length of the (CS) cylinder, an inner diameter 16, and an outer diameter 17. In the alternative embodiment, the (CS) material 12 may be shaped as a pipe, tube, cylinder, sleeve, channel, or conduit. The cross-sectional shape of the (CS) cylinder may be circular. In either embodiment (bar or hollow cylinder), the length of the (CS) material 12 may be the same as the length of the (CRA) cylinder 10. The outer diameter 17 of the (CS) material 12 may have a dimension designed for an interference fit with the inner diameter 13 of the (CRA) cylinder 10. In the embodiment having a hollow cylinder (CS) material, the thickness of the cylinder may range from 0.50 inches to 3.00 inches or higher.

FIG. 1D illustrates an embodiment of a composite billet assembly 14 that is formed by inserting the (CS) material 12 into the (CRA) cylinder 10 according to the following process. To begin with, the (CS) material 12 and the (CRA) cylinder 10 may be machined as required to meet strict dimensional tolerances for a designed interference fit. Next, the mating surfaces, i.e., the inner diameter 13 of the (CRA) cylinder 10 and the outer diameter 17 of the (CS) material 12 cleaned of all contaminants and deleterious elements, such as oxides, oils, and rust, grease, industrial dust and particulates. The cleaning may be performed by a cleaning device 18, such as an abrasive blaster using an abrasive media to remove deleterious materials and leave a fresh, un-oxidized surface. Other types of cleaning devices 18 may include machining devices used to form the (CRA) cylinder 10 and the (CS) material 12 to specified tolerances, and may include solvents that remove oils and grease without leaving a residue.

The (CRA) cylinder 10 is then heated with a heater 19 to expand at least the inner diameter 13 of the (CRA) cylinder 10. The heater 19 may be a furnace, or other device that produces heat via infrared or electric resistance. Alternatively, the heater 19 may be an optical lamp source. The heater 19 may be positioned to heat the inner diameter 13 directly, or may be positioned to heat from the outer diameter 15. Heating temperatures required to expand at least the inner diameter 13 of the (CRA) cylinder 10 range from 300° F. to 1400° F. As the (CRA) cylinder 10 heats, a gap is produced between the inner diameter 13 of the (CRA) cylinder 10 and the outer diameter 17 of the (CS) material 12, allowing the (CS) material 12 to be inserted into the (CRA) cylinder 10 without resistance. The insertion may be performed with a lift device (not shown). The (CS) material 12 is then inserted into the hollow interior 11 of the heated (CRA) cylinder 10 so that the outer diameter 17 (outer surface) of the (CS) material 12 faces the inner diameter 13 of the (CRA) cylinder 10. Once the (CS) material 12 has been inserted into the heated (CRA) cylinder 10, heater 19 is turned off and the (CRA) cylinder 10 is allowed to cool. The cooling may simply be the result of turning off the heater 19 so that the (CRA) cylinder 10 is no longer subjected to the heat from the heater 19. In the cooling process, the (CRA) cylinder 10 should cool uniformly. For instance, the (CRA) cylinder 10 may cool simply by being subject to room temperature or ambient atmosphere. In other embodiments, the cooling may be accelerated by a cooling device (not shown), such as one producing forced air, that is turned on after the heater 19 is turned off. Cooling of the (CRA) cylinder 10 causes at least the inner diameter 13 of the (CRA) cylinder 10 to contract so that the inner diameter 13 shrinks onto the outer surface or diameter 17 of the (CS) material 12, creating a tight interference fit at an interface 20, or mating area of the inner diameter 13 of the (CRA) cylinder 10 and the outer surface or diameter 17 of the (CS) material 12. The mated (CS) material 12/(CRA) cylinder 10 creates a composite billet assembly 14 having a core formed by the (CS) material 12 and an outer cladding formed by the (CRA) cylinder 10. The interference fit at the interface 20 may be protected from oxidation by welding the interface 20 at opposite ends (i.e., top and bottom ends) of the composite billet assembly 14 with a welding device 21. The resulting welds 22 create a seal against oxidation of the interface 20 during heating of the composite billet assembly prior to extrusion.

Figure 3:
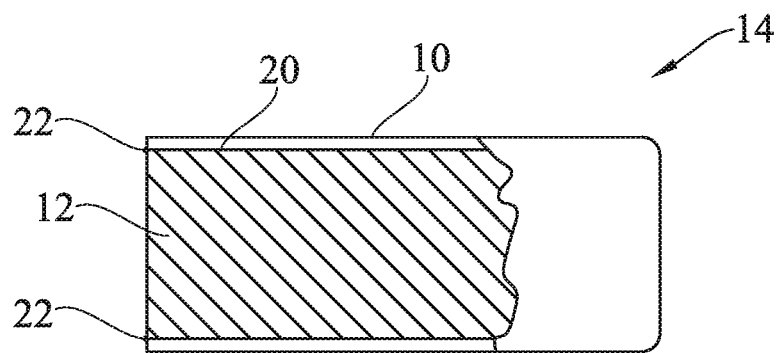
FIG. 3 illustrates a cross-sectional view of the composite billet assembly according to an embodiment.

FIG. 2 illustrates a perspective view of the composite billet assembly 14. In the illustrated embodiment, the composite billet assembly 14 includes a bar-shaped (CS) material 12 core, and so the composite billet assembly 14 has the form of a composite billet bar assembly. However, in the embodiment in which a hollow cylinder (CS) material 12 is used as the core, the composite billet assembly 14 would form a composite billet pipe assembly (not shown). FIG. 3 illustrates a cross-sectional view of the composite billet assembly 14 of FIG. 2. FIG. 3 shows a cross-sectional view of the (CS) material 12 core, the outer (CRA) cylinder 10 layer, and the welds 22 at the end of the composite billet assembly 14 that seal the interface 20.

Figure 4:
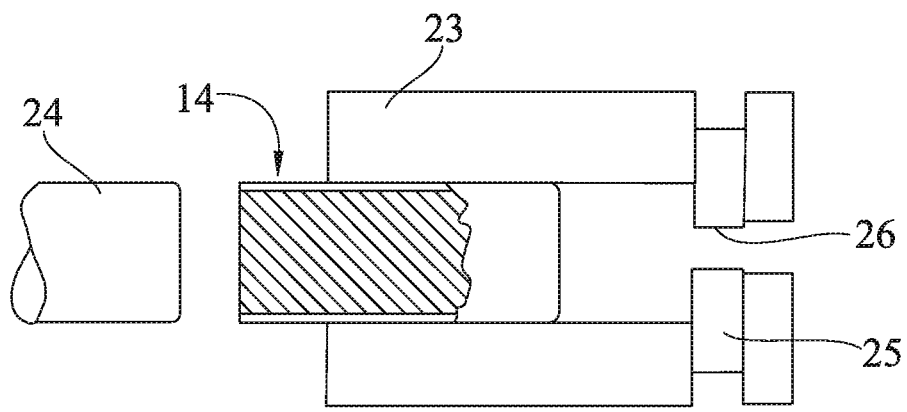
FIG. 4 illustrates an embodiment of an extrusion press.
Figure 5:
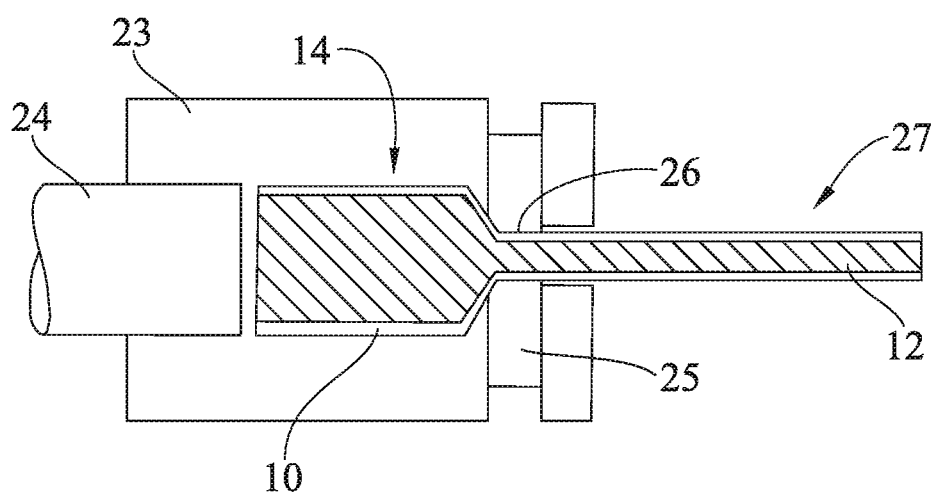
FIG. 5 illustrates an embodiment of an extrusion process.

FIG. 4 illustrates an embodiment of an extruder, such as an extrusion press 23 for extruding the composite billet assembly 14 at high temperatures to reduce the size of the composite billet assembly 14 and form a clad feedstock billet 27 (see FIG. 6). For forming a clad mother pipe 29 (see FIG. 7) from the composite billet assembly 14, the extrusion press 23 is fitted with a cylindrical mandrel (not shown), which is inserted into the inner cylindrical opening of the composite billet assembly 14, and extends beyond the die opening 26 of the die 25 for some length to form the inner diameter of the extruded clad mother pipe. The composite billet assembly 14 is first heated in a furnace (not shown) to a predetermined high temperature and rapidly transferred to the extrusion press 23 so as to not cool below the preset extrusion temperature, and extruded at the extrusion press 23. The extrusion press 23 includes a press ram 24 that presses the composite billet assembly 14 through the die opening 26 of a die 25. During extrusion, the composite billet assembly 14 undergoes significant cross-sectional size reduction by passing through the die opening 26, as shown in FIG. 5, under very high pressures, such as 20,000 psi to 70,000 psi, depending on the capacity of the press, applied at high temperatures, such as 1800° F. to 2400° F. The size of the composite billet assembly 14 is reduced by the extrusion press 23 reducing a thickness of each of the (CRA) cylinder 10 and the solid (CS) material 12. The proportion of the thickness reduction of the (CRA) cylinder 10 and the solid (CS) material 12 is the same throughout the cross-sectional area of the composite billet assembly 14 and along the length of the of the composite billet assembly 14 as it passes through the die opening 26. As the size of the composite billet assembly 14 is reduced through the die opening 26, clean, fresh, new un-oxidized surfaces of the composite billet assembly 14 are created at the interface 20 between the (CS) material 12 and the (CRA) cylinder 10 and forced to metallurgically bond at the interface 20 as the composite billet assembly 14 elongates to its new shape. The metallurgical bond is an atom-to-atom bond between the (CS) material 12 and the (CRA) cylinder 10. In the composite billet assembly interface 20, the material of the (CS) material 12 is in intimate contact with the material of the (CRA) cylinder 10, with no gaps therebetweeen to entrap oxygen and oxidize upon heating. Thus, when the new surfaces are being created as the composite billet assembly 14 undergoes significant reductions at high pressures and temperatures, a 100% metallurgical bond is created between the material of the (CS) material 12 and the material of the (CRA) cylinder 10. The metallurgical bond is a critical factor for determining success or failure of the resulting clad feedstock billet 27 (see FIG. 6) and the clad mother pipe 29 (see FIG. 7). Once the bond is created, it is nearly indestructible, with the two materials of the (CS) material 12 and the (CRA) cylinder 10 joined to become one unitized material and perform just like any other solid material. This allows the clad feedstock billet 27 to then be hot rolled to a clad bar 28 (see FIG. 6) in the form of, for example, rebar, sucker rods, shafts and other products that can be easily bent, fabricated in a shop and the field, and welded as needed, to provide excellent service and design life in corrosive environments. Similarly, the clad mother pipe 29 is then cold pilgered and/or cold drawn to a clad pipe 30 (see FIG. 7) that can be easily bent, fabricated in a shop and the field, and welded as needed, to provide better service and design life in corrosive environments. It is noted that the thickness of the (CRA) cylinder 10 before extrusion is drastically reduced proportionately after extrusion, so that the (CRA) cylinder 10 forms a relatively thin clad material layer around the outer diameter of the clad feedstock billet 27 (see FIG. 6) and the clad mother pipe 29 (see FIG. 7).

The cross-sectional shape of the clad feedstock billet 27, shown in FIG. 6, after the extruding process is not particularly limiting, and in preferred embodiments the cross-sectional shape is one of a circle, a cylinder, a rectangle, and a square. The cross-sectional shape is determined by the shape of the die opening 26, and so the die opening 26 may have a shape that is one of a circle, a cylinder, a rectangle, and a square. Other polygonal cross-sectional shapes are possible, and depend on the shape of the die opening 26. That is, the die opening 26 may have a polygonal or angular shape other than a circle, a cylinder, a rectangle, and a square. Thus, the clad feedstock billet 27 can be produced to the exact feedstock dimensional requirements of a rod rolling mill. The cross-sectional shape of the clad mother pipe 29, shown in FIG. 7, after the extruding process is circular according to a preferred embodiment. The clad mother pipe 29 can be produced to the exact dimensional requirements of a cold pilger/cold draw mill.

As used herein, the term "clad billet" refers to the intermediate product of both a clad feedstock billet, such as the clad feedstock billet 27 shown in FIG. 6 and used to form clad bars, and to a clad mother pipe, such as the clad mother pipe 29 shown in FIG. 7 and used to form clad pipes. That is, a "clad billet" as used herein may be a clad feedstock billet, or may be a clad mother pipe. The cross-sectional area of the clad billet discussed herein is not particularly limiting, and may be a function of the cross-sectional area of the die opening 26. In a preferred embodiment, a circular cross-sectional area of the clad billet may result from a diameter of 3 inches to 10 inches of the clad billet; or from a length and width of from 3 inches to 10 inches for a square cross-sectional area. In other embodiments, the dimension (e.g., diameter, length or width) used for the cross-sectional area of the clad billet may be from about 1 inch to 20 inches after extruding. The length of the clad billet after extrusion may be from about 20 feet to 40 feet long, or may be up to about 60 feet long in some instances. These lengths of clad billets can produce an equal mass of the required extruded clad billet product. For example, the clad bar 28 shown in FIG. 7 (e.g., rebar) having a diameter of about 0.375 inches to 1.75 inches may have a length of, for example, 2500 feet, and be formed in a hot-rolling process at, for instance, a rod rolling mill.

Reductions of the clad feedstock billet 27 through multiple stages of the rod rolling mill, which reductions change the shape and form of the billet at each stage, further consolidates the metallurgical bond and makes clad thickness uniform around the circumferential (outer diameter) surface, to produce stainless clad rebar (SCR), sucker rods, and other finished clad bar products. Similarly, the clad mother pipe 29 formed by hot extrusion of the clad billet assembly 14 will be processed through multiple stages of reduction in a cold pilger mill and/or a cold draw bench to reduce the diameter and thickness of the composite wall at each stage. It may be necessary to provide intermediate stress relieving steps prior to resuming further cold reducing steps to arrive at the final dimensions of outside dimension and wall thickness of the clad pipe.

A system for producing a clad billet may include the components and devices discussed herein. For example, the system may include a (CRA) cylinder 10 including the aspects discussed herein; and a solid (CS) material 12 including the aspects discussed herein. The system may further include a cleaning device 18 including the aspects discussed herein for cleaning at least one of oxides, oils and rust from the outer surface (e.g., outer diameter 17) of the solid (CS) material 12 and the surface of the inner diameter 13 of the (CRA) cylinder 10. A heater 19 including the aspects discussed herein is provided in the system for heating the (CRA) cylinder 10 to expand at least the inner diameter 13 of the (CRA) cylinder 10. The system may include an insertion device for inserting the solid (CS) material 12 into the hollow interior of the heated (CRA) cylinder 10 so that the outer surface (e.g., outer diameter 17) of the solid (CS) material 12 faces the inner diameter 13 of the (CRA) cylinder 10. The system further includes an area, such as a room, open space, a platform to allow cooling, as discussed herein, of the heated (CRA) cylinder 10 to contract at least the inner diameter 13 of the (CRA) cylinder 10 so that the inner diameter 13 shrinks onto the outer surface (e.g., outer diameter 17) of the solid (CS) material 12, creating an interference fit at an interface 20, as discussed herein, with the outer surface (e.g., outer diameter 17) of the solid (CS) material 12, resulting in a composite billet assembly 14 having the aspects discussed herein. The system may also include a welding device 21, as discussed herein, for welding each opposite end of the composite billet assembly 14 at the interface 20 to create a seal against oxidation of the interface 20, as discussed herein. The system further includes an extruder 23, as discussed herein, for extruding the composite billet assembly 14 to reduce the size of the composite billet assembly 14 and form a clad billet having a metallurgical bond, as discussed herein, between the solid (CS) material 12 and the (CRA) cylinder 10. The clad billet may be a clad feedstock billet 27 (see, e.g., FIG. 6) or a clad mother pipe 29 (see, e.g., FIG. 7). The system may comprise a hot-rolling device, such as in a rod rolling mill or pipe mill as discussed herein, for hot-rolling a clad feedstock billet 27 to form a clad bar 28, as discussed herein. The system may comprise a cold pilgering/cold drawing device, such as in a cold pilgering/cold drawing mill, for cold pilgering/cold drawing a clad mother pipe 29 to form a clad pipe 30, as discussed herein.

FIG. 8 illustrates a flow chart representing steps associated with a method for producing a metallurgically bonded clad billet and products thereof. The method may include the embodiments and aspects discussed herein. The process may being with a solid (CS) material 12 and a (CRA) cylinder 10 that have been machined as required to meet the dimensional tolerances for a designed interference fit, as discussed above. In step 30, the outer surface (e.g., outer diameter 17) of the solid (CS) material 12 and the inner diameter 13 of the (CRA) cylinder 10 may be cleaned, as discussed herein, to remove at least one of oxides, oils, rust, and other deleterious elements. The solid (CS) material 12 may be a bar, or may be a hollow cylinder, as discussed herein. In step 31, the (CRA) cylinder 10 is heated to expand at least the inner diameter 13 of the (CRA) cylinder 10, as discussed herein. In step 32, the solid (CS) material 12 is inserted into the hollow interior 11 of the (CRA) cylinder 10, so that an outer surface (e.g., outer diameter 17) of the solid (CS) material 12 faces the inner diameter 13 of the (CRA) cylinder 10, as discussed herein. In step 33, the (CRA) cylinder 10 is cooled, or allowed to cool, as discussed herein, in order to contract at least the inner diameter 13 of the (CRA) cylinder 10 so that the inner diameter 13 shrinks onto the outer surface (e.g., outer diameter 17) of the solid (CS) material 12, creating an interference fit at an interface 20 with the outer surface (e.g., outer diameter 17), as discussed herein, resulting in a composite billet assembly 14. In step 34, each opposite end of the composite billet assembly 14 may be welded at the interface 20, as discussed herein, to create a seal against oxidation of the interface 20. In step 35, the composite billet assembly 14 is hot extruded, such as with the extrusion press 23 discussed herein, to reduce the size of the composite billet assembly 14 and form a clad billet having a metallurgical bond between the solid (CS) material 12 and the (CRA) cylinder 10, as discussed herein. The clad billet may be a clad feedstock billet 27 or a clad mother pipe 29, as discussed herein. As discussed herein, the metallurgical bond is an atom-to-atom bond between the solid (CS) material 12 and the (CRA) cylinder 10. The process then proceeds to either step 36 or step 37. In step 36, the clad feedstock billet 27 is fed to a hot-rolling device, such as at a rod rolling mill as discussed herein, to form a clad product. Hot-rolling a clad feedstock billet 27 having a bar-shaped solid (CS) material 12 forms a clad bar 28. On the other hand, in step 37 the clad mother pipe 29 is fed to a cold pilgering/cold drawing device, such as at a cold pilgering/cold drawing mill as discussed herein, to form a clad pipe. That is cold pilgering/cold drawing a clad mother pipe 29 having a hollow cylinder-shaped solid (CS) material 12 forms a clad pipe 29.

While various embodiments usable within the scope of the present disclosure have been described with emphasis, it should be understood that within the scope of the appended claims, the present invention may be practiced other than as specifically described herein.

What is claimed is:

1. A method of producing a clad billet, comprising:
   heating a corrosion resistant alloy cylinder to a temperature of 900° F. to 1400° F., the corrosion resistant alloy cylinder including a hollow interior, an inner diameter, and an outer diameter, wherein the heating expands at least the inner diameter;
   inserting a solid carbon or low-alloy steel material into the hollow interior of the heated corrosion resistant alloy cylinder so that an outer surface of the solid carbon or low-alloy steel material faces the inner diameter of the corrosion resistant alloy cylinder;
   cooling the heated corrosion resistant alloy cylinder to contract at least the inner diameter of the corrosion resistant alloy cylinder so that the inner diameter shrinks onto the outer surface of the solid carbon or low-alloy steel material creating an interference fit at an interface with the outer surface and resulting in a composite billet assembly; and
   extruding the composite billet assembly to reduce the size of the composite billet assembly by reducing a thickness of each of the corrosion resistant alloy cylinder and the solid carbon or low-alloy steel material and form the clad billet having a metallurgical bond between the solid carbon or low-alloy steel material and the corrosion resistant alloy cylinder.

2. The method of claim 1, further comprising:
   cleaning the outer surface of the solid carbon or low-alloy steel material and the surface of the inner diameter of the corrosion resistant alloy cylinder, before inserting the solid carbon or low-alloy steel material into the hollow interior of the heated corrosion resistant alloy cylinder.

3. The method of claim 2, wherein the cleaning removes at least one of oxides, oils and rust.

4. The method of claim 1, further comprising:
   welding each opposite end of the composite billet assembly at the interface, before extruding the composite billet assembly, to create a seal against oxidation of the interface.

5. The method of claim 1, wherein the composite billet assembly comprises an outer diameter of 3 inches to 45 inches, and the clad billet comprises a cross-sectional dimension of 1 inch to 20 inches after the extruding.

6. The method of claim 1, further comprising:
   hot-rolling the clad billet.

7. The method of claim 1, further comprising:
   at least one of cold pilgering and cold drawing the clad billet.

8. The method of claim 1, wherein the solid carbon or low-alloy steel material is a bar.

9. The method of claim 1, wherein the solid carbon or low-alloy steel material is a hollow cylinder.

10. The method of claim 1, wherein the extruding shapes the clad billet to have a cross-sectional shape is one of a circle, a cylinder, a rectangle, and a square.

11. The method of claim 1, wherein the metallurgical bond is an atom-to-atom bond between the solid carbon or low-alloy steel material and the corrosion resistant alloy cylinder.

12. A clad billet formed by the method of claim 1, comprising:
    a carbon or low-alloy steel core formed by the solid carbon or low-alloy steel material; and
    a corrosion resistant alloy outer layer formed by the corrosion resistant alloy cylinder and covering the carbon or low-alloy steel core,
    wherein the corrosion resistant alloy outer layer has the metallurgical bond with the carbon or low-alloy steel core.

13. The clad billet of claim 12, further comprising:
    a length of 20 feet to 60 feet; and
    a cross-sectional dimension of 3 inches to 10 inches.

14. The clad billet of claim 12, wherein a cross-sectional shape of the composite billet assembly is one of a circle, a cylinder, a rectangle, and a square.

15. A system for producing a clad billet, comprising:
    a corrosion resistant alloy cylinder including a hollow interior, an inner diameter, and an outer diameter;
    a solid carbon or low-alloy steel material including an outer surface;
    a heater for heating the corrosion resistant alloy cylinder to a temperature of 900° F. to 1400° F. to expand at least the inner diameter of the corrosion resistant alloy cylinder;
    an insertion device for inserting the solid carbon or low-alloy steel material into the hollow interior of the heated corrosion resistant alloy cylinder so that the outer surface of the solid carbon or low-alloy steel material faces the inner diameter of the corrosion resistant alloy cylinder;

an area to allow cooling of the heated corrosion resistant alloy cylinder to contract at least the inner diameter of the corrosion resistant alloy cylinder so that the inner diameter shrinks onto the outer surface of the solid carbon or low-alloy steel material and creates an interference fit at an interface with the outer surface, resulting in a composite billet assembly; and an extruder for extruding the composite billet assembly to reduce the size of the composite billet assembly by reducing a thickness of each of the corrosion resistant alloy cylinder and the solid carbon or low-alloy steel material and form the clad billet having a metallurgical bond between the solid carbon or low-alloy steel material and the corrosion resistant alloy cylinder.

16. The system of claim 15, further comprising:
a cleaning device for cleaning at least one of oxides, oils and rust from the outer surface of the solid carbon or low-alloy steel material and the surface of the inner diameter of the corrosion resistant alloy cylinder.

17. The system of claim 15, further comprising:
a welding device for welding each opposite end of the composite billet assembly at the interface to create a seal against oxidation of the interface.

18. The system of claim 15, further comprising at least one of:
a hot-rolling device for hot-rolling the clad billet; and
a cold pilgering/cold drawing device for at least one of cold pilgering and cold drawing the clad billet.

\* \* \* \* \*